United States Patent [19]
Kawano et al.

[11] Patent Number: 5,594,872
[45] Date of Patent: Jan. 14, 1997

[54] METHOD OF COMMUNICATING MESSAGES IN A DISTRIBUTED PROCESSING SYSTEM

[75] Inventors: Shigeki Kawano, Yokosuka; Kinji Mori, Machida; Katsumi Kawano; Masayuki Orimo, both of Kawasaki; Shigeki Hirasawa, Sagamihara, all of Japan

[73] Assignee: Hitachi, Ltd., Tokyo, Japan

[21] Appl. No.: 233,743

[22] Filed: Apr. 26, 1994

[30] Foreign Application Priority Data

Apr. 27, 1993 [JP] Japan .................................. 5-100680

[51] Int. Cl.⁶ .......................... H04L 12/28; H04L 29/06
[52] U.S. Cl. ............................... 395/200.15; 395/200.16
[58] Field of Search ........................ 395/200, DIG. 1, 395/275, 200.12, 200.15, 200.16; 370/85.3, 94.1

[56] References Cited

U.S. PATENT DOCUMENTS

| | | | |
|---|---|---|---|
| 4,336,479 | 12/1982 | Mori et al. | 340/825.05 |
| 4,803,683 | 2/1989 | Mori et al. | 371/19 |
| 5,287,535 | 2/1994 | Sakagawa et al. | 370/60 |
| 5,297,143 | 3/1994 | Fridrich et al. | 370/85.3 |
| 5,347,304 | 9/1994 | Moura et al. | 348/12 |
| 5,361,256 | 11/1994 | Doeringer et al. | 370/60 |

FOREIGN PATENT DOCUMENTS 4-157940  5/1992  Japan .

OTHER PUBLICATIONS

Excerpt from Textbook; "TCP/IP"; ISBN4-915778-01-5C3055 P5150E; Japan; Mar. 15, 1991; pp. 119-145; by Takeshi Nishida.

"Internetworking with TCP/IP", vol. 1, 1991, Comer, pp. 1-41, 51-121, 158-203, 281-291, 337-363.

*Primary Examiner*—Alpesh M. Shah
*Assistant Examiner*—Mark H. Rinehart
*Attorney, Agent, or Firm*—Antonelli, Terry, Stout & Kraus, LLP

[57] ABSTRACT

In an information processing system having plural processing units connected through a communication medium, each processing unit operates to receive information to be transmitted from a processing portion operating in the processing unit to the communication medium and a content code predetermined according to the content of the information to be transmitted. Based on the received content code, the processing unit operates to determine an address of the destination processing unit, a sending mode used for transmitting the information, and whether or not the more reliable communication method arranged to establish a connection between the processing units is used for transmitting the information. Then, by using the sending mode and the communication method obtained as the determined result, the information is transmitted to the processing unit having an address obtained as the result determined through the communication medium.

30 Claims, 11 Drawing Sheets

| CONTENT CODE | DESTINATION ADDRESS | CONNECTION ESTABLISH-MENT | GROUP ID | GROUP LEVEL | CONNECTION ESTABLISHED FLAG | BUFFER ID |
|---|---|---|---|---|---|---|
| CC5 | 4235D | 1 | P | 1 | 1 | 21 |
| CC7 | 147C6 | 0 | R | 1 | 0 | 17 |
| CC5 | 3221F | 1 | B | 2 | 0 | — |
| --- | --- | --- | --- | --- | --- | --- |
| 211 | 212 | 213 | 214 | 215 | 216 | 217 |

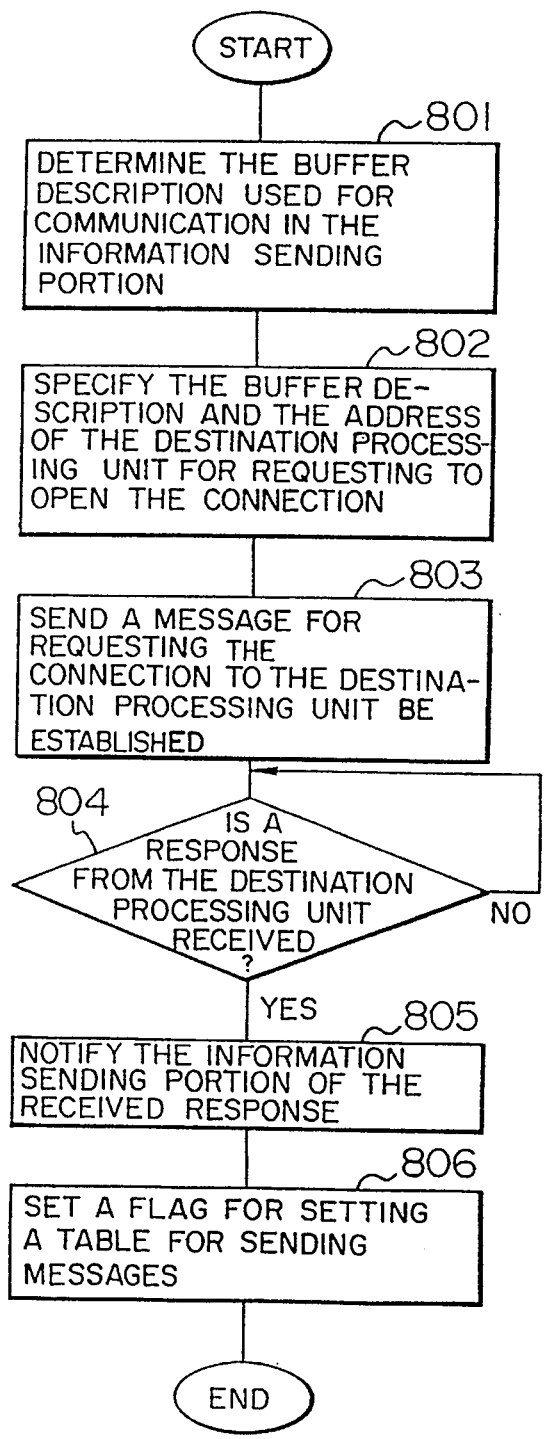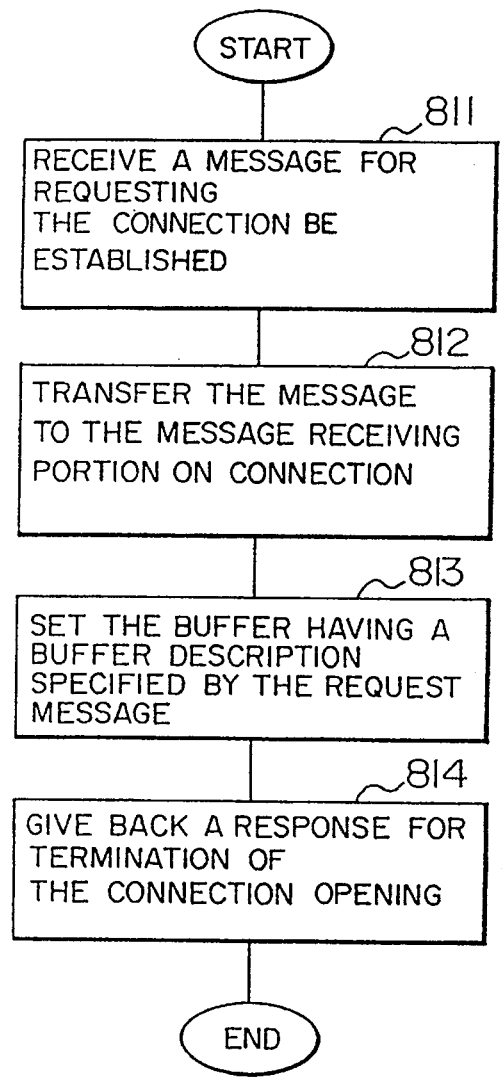

| CONTENT CODE | CONNECTION ESTABLISH- MENT | GROUP ID | CONNECTION ESTABLISHED FLAG | BUFFER ID |
|---|---|---|---|---|
| CC5 | 1 | P | 1 | 21 |
| CC7 | 0 | R | 0 | 17 |
| ⋮ | ⋮ | ⋮ | ⋮ | ⋮ |

| GROUP DESCRIPTION | DESTINATION ADDRESS | GROUP LEVEL |
|---|---|---|
| P | 4235D | 1 |
| R | 147C6, 3124B | 1 |
| ⋮ | ⋮ | ⋮ |

| CONTENT CODE | GROUP DESCRIPTION |
|---|---|
| CC5 | P |
| CC7 | R |
| ⋮ | ⋮ |

| GROUP ID | DESTINATION ADDRESS | GROUP LEVEL | CONNECTION ESTABLISHMENT | BUFFER ID |
|---|---|---|---|---|
| P | 4235D | 1 | 1 | 21 |
| R | 147C6, 3124B | 1 | 0 | 17 |
| ⋮ | ⋮ | ⋮ | ⋮ | ⋮ |

1111   1112   1113   1114   1115

5,594,872

METHOD OF COMMUNICATING MESSAGES IN A DISTRIBUTED PROCESSING SYSTEM

BACKGROUND OF THE INVENTION

The present invention relates to an information processing system arranged to have plural processing units like computers connected with each other, and in particular to a method of sending or receiving information among the processing units through a network and the apparatus thereof.

Conventionally, an information processing system for transferring information through a network such as a distributed processing system has employed one of two systems, that is, a Unicast system and a Broadcast system. The Unicast system is arranged so that a processing unit for transmitting data specifies an address of a processing unit for receiving the data, thus implementing one-to-one data transfer. On the other hand, the Broadcast system is arranged so that data sent from a processing unit connected in the network is received by all of the other processing units connected in the network.

To send data as specifying plural processing units contained in a network, for example, a communication protocol referred to as Internet Protocol includes the method of dividing a node address into a field indicating a subnetwork and a field indicating a host. In addition to the Unicast and the Broadcast, sending of data to all the nodes contained in the subnetwork, that is, grouping of destinations (Multicast communication) is allowed to be implemented. The method for creating or releasing a group in the Multicast communication at any time is disclosed in J-P-A-4-157940. In this method, a node requesting participation in a group sends a request of participation with a group address as a parameter to another node through the Broadcast communication. A right of representation for the group is possessed by the node having first requested participation in the group. The node operates to process a request of participation sent from another node and manage the nodes in the group. In this system, any node is able to participate in a group at any time or belong to plural groups.

If the Unicast or the Multicast is used as means for communicating with another processing unit in the network, for providing communication, it is possible to establish a connection between the subject processing units. The connection termed herein includes a physical connection between the processing units as well as an overall communicating protocol for supporting transmission authentication to re-transmitting of a message if any error takes place in the signal between the subject processing units. In this case, a response for authenticating the receipt of a message is given back from the receiving processing unit to the sender processing unit. This response makes great contribution to enhancing reliability of data transmission. The Broadcast communication, on the other hand, requires that a connection be established among all of the processing units. This makes the load that is burdened on the network very excessive. Hence, ordinarily, the communication is done without having to establish the connection. It means that the Broadcast communication has lower reliability of data transmission than the Unicast or the Multicast.

In the aforementioned techniques, any one of the communicating methods is selected for transmitting data or any one of the processing units (or the groups of the processing units in the case of the Multicast) is determined as a destination by a user program (or application program) running on the processing unit. To transmit data on the Unicast or the Multicast, the user program is required to grasp an arrangement of the system on the user program. The change or expansion of the system arrangement cannot be easily done. To solve this shortcoming, the U.S. Pat. No. 4,366,479, for example, discloses the method for broadcasting data from the transmitting side with a description defined according to the content of the data called the content code and entrusting judgement as to data requirement to the receiving processing unit. This method, however, provides lower reliability of data transmission than the Unicast or the Multicast, because all of the data are broadcast.

The J-P-A 4-157940, on the other hand, discloses a technique of enabling grouping or regrouping of the processing units running on a network. If, however, a new node (processing unit) is added to the network, the existing nodes cannot recognize information such as an address of the newly added node. That is, for the communication method requiring that a destination address be specified, like the Unicast or the Multicast, online addition or deletion of a node is not allowed.

The conventional Multicast has the capability of restricting a sending range of data by defining a destination address when registering a group. The receiving node receives all of the data sent to the group(s) to which it belongs. In actuality, however, the processing units contained in the group for the Multicast do not need all of the data sent to the group. That is, the conventional Multicast communication is considered as a system for broadcasting data in a group and does not have exceptional sending efficiency in the group.

SUMMARY OF THE INVENTION

It is an object of the present invention to provide a method of communicating data which may employ a communication method suitable to either of the content of the data or the quality of data.

It is a further object of the present invention to provide a method of communicating data and a computer system which are allowed to create a program without requiring a user to be aware of the system configuration and to further add or delete a processing unit to the system network in an online state without having to stop the operation of all the processing units in the system network.

To attain the objects mentioned above, according to an aspect of the invention, plural processing units connected through a communication medium receive a data description predetermined according to the content of information together with the information to be sent from a user program running on each of the processing units. By referring to the received data description, a destination processing unit for the received information is determined from the pre-contained information indicating correspondence between the data description and the destination processing unit. Then, the information is sent to the determined destination processing unit. Furthermore, based on the information indicating correspondence between the data description and the destination processing unit, the sending mode used for transmitting the information is also determined. According to the determined sending mode, the information is sent to another processing unit through for example, the Unicast, the Multicast or the Broadcast. Alternatively, based on the information indicating correspondence between the data description and the destination processing unit, it is determined whether or not the communication method having the predetermined protocol for enhancing the reliability of the data transmission is used. Information is sent to another processing unit through the determined communication method.

According to another aspect of the present invention, plural processing units connected through a communication medium receive information to be sent, a data description predetermined according to the content of information contained therein, and information indicating a qualitative characteristic of information represented by information importance level from a user program running on each of the processing units. Based on at least one of the data description and the information indicating the qualitative characteristic, which, in turn, is based on the precontained information indicating correspondence between the data description and the destination processing unit, the destination processing unit for the received information, the sending mode for transmitting the information and/or whether or not the communication method having a predetermined protocol for enhancing the reliability is used, are determined. According to the determined results set forth above, the information is the transmitted. Each processing unit adds a description for identifying the destination processing unit and a data description specified by the user program to the information to be sent when transmitting the information on the communication medium. The processing unit for receiving transmitted information operates to receive information according to the description of the processing unit. Based on the data description added to the information, the user program operating on the processing unit to which the received information is transmitted is determined. The received information is transferred to the determined user program.

With the foregoing method, according to the present invention, the user program operating on each processing unit can send information for the user program operating on another processing unit without having to be conscious of the system configuration. Based on the user description and/or information representing a qualitative characteristic of information, each processing unit operates to determine a destination processing unit, a sending mode to be used for transmitting data, or whether or not a more reliable communication method is to be used. Hence, information is transferred to a suitable range according to the content of the information to be sent or, in the alternative, the information is allowed to be transferred according to the suitable method.

According to another aspect of the present invention, in a distributed processing system having plural processing units connected through a communication medium, each processing unit receives information to be sent to another processing unit, said information being output from a user program operating on each of the processing units, together with a data description predetermined according to the content of information and information representing a qualitative characteristic represented by the information indicating the importance level of the data. Then, based on information contained in a table for storing in a corresponding manner, the data description and/or information representing a characteristic, and a destination processing unit, a sending mode for sending information, and/or whether or not the communication method having a predetermined protocol for enhancing the reliability is used, it is determined how the information is to be transmitted. Further, when a new processing unit is connected to such a system, this new processing unit operates to send out the information about the processing unit itself, in particular, a message containing a data description for the content of information required by the new processing unit and a processing unit description allocated to the new processing unit to another existing processing unit. In the other existing process, the content of the table is updated based on this message. The information about each processing unit is sent from another existing processing unit. Based on the information, the table is created. With this process, if the connecting environment is changed, all of the processing units in the system are allowed to be communicated with each other, based on the updated table.

BRIEF DESCRIPTION OF THE DRAWINGS

FIG. 4B is a view showing a table of transmission information held in the data transmission management area;

FIG. 8A is a flowchart showing a process implemented by the processing unit for sending a message when a connection is established;

FIG. 8B is a flowchart showing a process implemented by the processing unit for receiving a message when a connection is established;

FIG. 10A is a diagram showing a table for sending messages held in a data transmission management area included in a second embodiment of the present invention:

FIG. 10B is a diagram showing a data attribute table held in the data transmission management area included in the second embodiment;

FIG. 11A is a diagram showing a table for sending messages held in the data transmission management area included in a third embodiment of the present invention; and FIG. 11B is a diagram showing a data attribute table held in the data transmission management area included in the third embodiment.

DETAILED DESCRIPTION OF THE PREFERRED EMBODIMENTS

Figure 1:
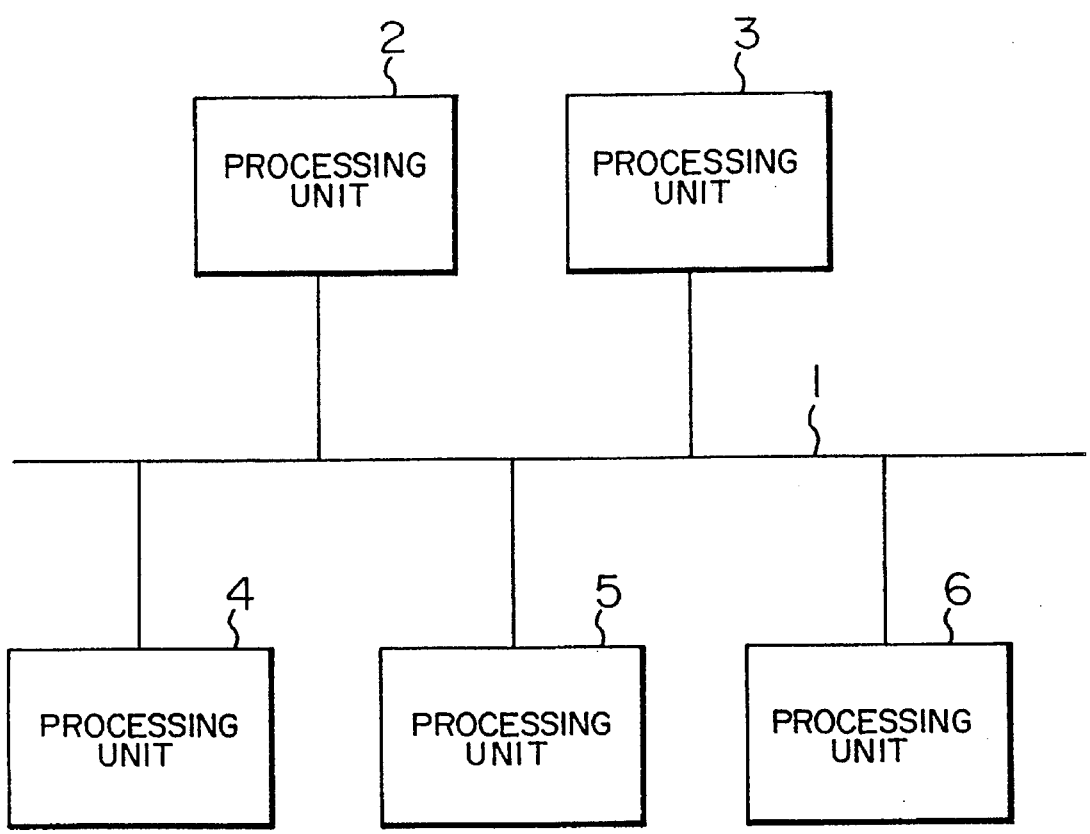
FIG. 1 is a block diagram showing a computer system to which the present invention applies.

FIG. 1 is a block diagram showing an arrangement of an information processing system to which the present invention applies. In FIG. 1, a numeral 1 denotes a communication medium. Numerals 2 to 6 denote processing units. The processing units 2 to 6 are all connected to the communication medium 1 through which those processing units 2 to 6 are communicated with each other. The communication medium 1 may be a communication line such as LAN or WAN.

Figure 2:
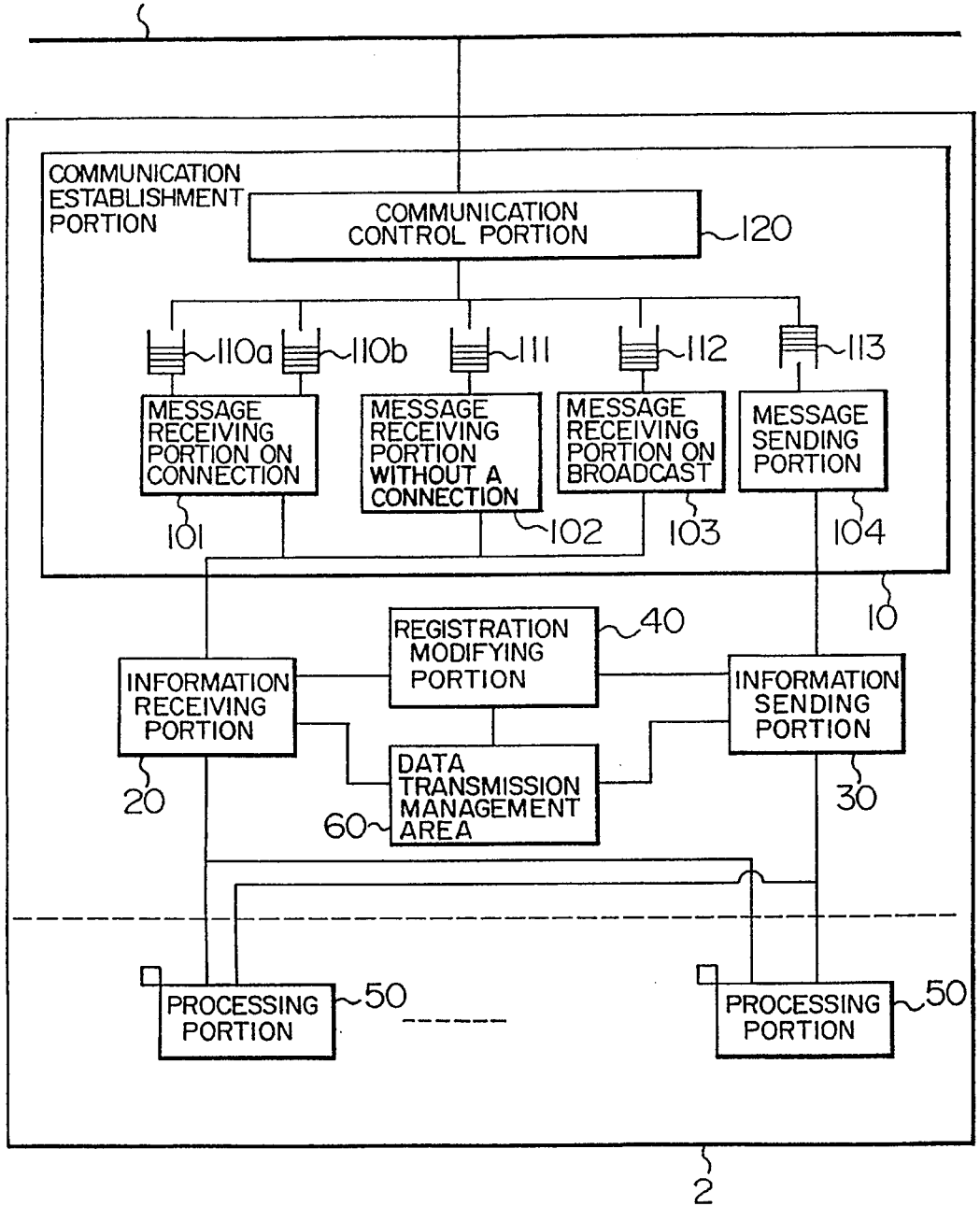
FIG. 2 is a block diagram showing a functional arrangement of a processing unit according to an embodiment of the present invention.

FIG. 2 is a block diagram showing a functional arrangement of the processing unit 2 as shown in FIG. 1. Later, the description will be oriented to the arrangement of the processing unit 2, for example. The other processing units each have the same arrangement. As shown, the processing unit 2 is arranged to have a communication establishment portion 10, an information receiving portion 20, an information sending portion 30, a registration modifying portion 40, a processing portion 50, and a data transmission management area 60. The communication establishment portion 10 includes, within, a message receiving portion on connection 101 for receiving a message regarding a connection formed with another processing unit, a message sending portion without a connection for receiving a message in the Unicast mode or a Multicast mode without establishing the connection, a message receiving portion based on broadcast 102 for receiving a message directed to all of the processing units inside of a network, a message sending portion 104 for transmitting a message, and a communication control portion 120 for controlling the transmitting or receiving of a message to the communication medium 1. The communication establishment portion 10 provides buffers 110a, 110b located for the message receiving portions based on connection, respectively, a buffer 111 located for the message receiving portion without connection 102, a buffer 112 located for the message receiving portion based on broadcast 103, and a buffer 113 located for the message sending portion 104. The buffers 110a, 110b, 111 and 112 have buffer descriptions assigned for identifying themselves from the communication control portion 120. The buffers 110a, 111 and 112 have a common buffer description to another processing unit, the description being predetermined inside of the system. There is just one buffer 110b for the message receiving portion based on connection 101. However, the buffer 110b is created for each of the connections formed with the transmitting processing units. The buffer 110 for each connection has the corresponding allocated buffer description. In addition, the buffer 110a for the message receiving portion based on connection 101 is used only for receiving a request for establishing a connection when the connection is needed. It is not used for an ordinary message.

Figure 3:
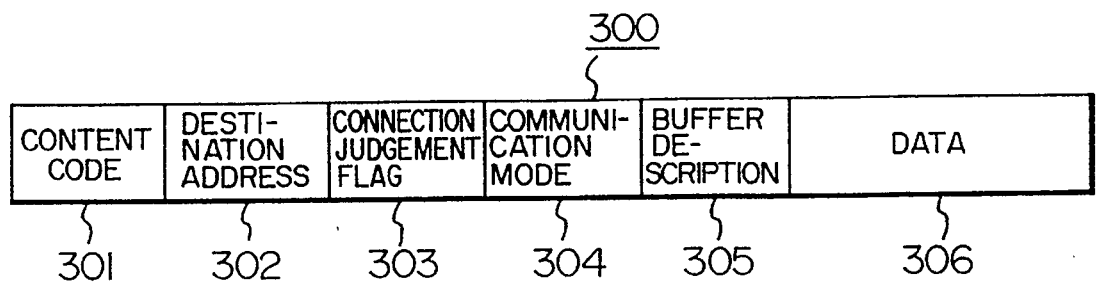
FIG. 3 is a view showing a format of a message to be transferred through a communication medium.

FIG. 3 shows a format of a message to be transmitted through the transmission medium 1. The message 300 includes a data portion 306 for holding data to be transmitted between the processing portions 50 of the processing units through the communication medium 1. Further, it also includes as control information a content code (CC) portion 301 for holding a content code indicating a content of data, a destination address (SA) portion 302 for holding an address of a destination processing unit, a connection judgement flag (SS) 303 of a message for indicating whether or not a connection is established between a transmitter and a receiver, a mode (CO) portion 304 for holding a communication mode indicating a mode to be used for communicating a message, that is, the Unicast, the Multicast, and the Broadcast modes, and a buffer description portion 305 for specifying a buffer of a processing unit as a receiver. The message 300 contains additional information used for sensing an error occurring while a message is communicated based on the connection, for example. Such additional information is not shown, because they do not directly concern the present invention.

A message sent through the communication medium 1 is received by the communication control portion 120. The communication control portion 120 receives the message by referring to the destination address portion 302 of the message 300 transmitted on the communication medium 1. The received message 300 is stored in any of the buffers 110b to 112 according to the buffer description contained in the message 300. The message receiving portion based on connection 101, the message receiving portion without connection 102, and the message receiving portion on broadcast 103 operate to read messages from the corresponding buffers 110b to 112 and pass them to the information receiving portion 20. When the information receiving portion 20 receives the message from the information establishment portion 10, the information receiving portion 20 determines whether or not the message is to be given to the processing portion 50. At last, the received information is given to the processing portion 50 for executing the process according to the message. The information to be given from the information receiving portion 20 to the processing portion 50 is restricted to the information stored in the data portion 306 of the received message.

The processing portion 50 performs a process indicated by the data received from the information receiving portion 20. In this embodiment, the processing portion 50 contains, for example, a user program or an application program created or used by a user. The processing portion 50 also sends the processed result or a request for referring to information required for the process to another processing unit if necessary. In this case, the processing portion 50 sends to the information sending portion 30 the information to be sent together with a content code indicating the content of the information and a group description representing how important the information is. The processing portion 50 may be arranged to perform a process without having to receive data contained in a message sent through the communication medium 1 or keep the processed result without sending it onto the communication medium 1.

The information sending portion 30 operates to determine a communication method for transmitting information and how important sending of the information is, based on a content code and a group description added to the information received from the processing portion 50. The information is obtained by referring to the data transmission management area 60. Then, the information sending portion 30 requests a process of transmitting to the message sending portion 104 provided in the communication establishment portion 10. When the information sending portion 30 requests the message sending portion 30 to send the information, the information to be sent is shaped according to the format as shown in FIG. 3 before giving it to the data sending portion 104. The data sending portion 104 operates to determine the destination processing unit based on the information sent from the information sending portion 30 and establish a connection suited to the communicating method of the information if necessary, before sending a message.

The registration modifying portion 40 operates to update the information held in the data transmission management area 60 if a new processing unit is added to the processing system, the processing unit is partially changed, or the system configuration is changed.

Figure 4A:
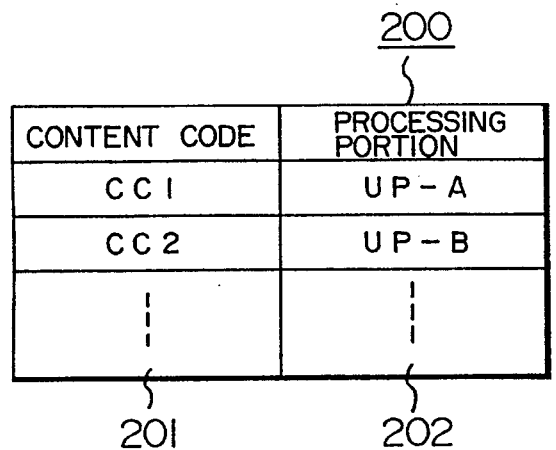
FIG. 4A is a view showing a table of received information held in a data transmission management area.

FIG. 4A shows a configuration of a table for receiving messages 200 held in the data transmission management area 60. The table for receiving messages 200 registers a content code (column 201) added to a message to be read by the processing unit 2 and a processing portion 50 (column 202) corresponding to the content code. The processing portion 50 uses a message containing the corresponding content code added thereto. The table for receiving messages 200 is a table to be referred to when data contained in the message received from the communication establishment portion 10 is passed to the processing portion 50. For example, in the table for receiving messages 200 as shown in FIG. 4A, a message having a content code "cc1" added thereto is transmitted to the processing portion "UP-A", while a message having a content code "cc2" added thereto is transmitted to the processing unit "UP-B".

FIG. 4B shows a table for sending messages held by the data management area 60 together with the table for received messages 200. The table for sending messages 210 stores information indicating the communicating method and the destination of a message generated by the processing portion 50. Specifically, the table 210 includes a content code column 211 for setting a content code indicating the content of a message, a destination address column 212 for setting an address of a destination processing unit, a connection establishment column 213 for entering information indicating whether or not a connection is established when a message is transmitted, a group description column 214 for indicating an importance level of information to be sent out, a group level column 215 indicating a priority level of each group when the information is sent, a communication establishment flag column 216 for entering a flag indicating whether or not a connection is formed with the destination processing unit, and a buffer description column 217 for registering a buffer description used by the destination processing unit. As an address to be entered to the destination address column 212, for the Unicast, only the address of the processing unit given to the destination is set to the column, while for the Multicast, a Multicast address (group address) commonly given to the destination processing units is entered to the column. Further, when transmitting the message on the Broadcast, the address predetermined for the Broadcast (Broadcast address) is entered to the destination address column. In this embodiment, the information to be sent belongs to any of the groups corresponding to the levels of importance for the data. In the group description column, the description defined for identifying the group is set.

In the table for sending messages 21 as shown in FIG. 4B, for example, on the first line, a message has a content code "cc5" added thereto and "P" given as a group description. This message is sent to "4235D" of a destination address through a connection established by using the buffer 110b to which the buffer description "21" is allocated. In FIGS. 4A and 4B, the sending information for the message having the content code "cc5" added thereto is also entered on the third line. In this embodiment, by adjusting a value of the group description, the range of the processing units to which the message having the same content code is conveyed is allowed to be dynamically changed depending on the importance level of the message to be transmitted. The group description to be applied to the message having the same content code added thereto is allowed to be entered so that the group description for a higher importance level may include the group description for a lower importance level. In this case, about the message of the same content code, a different group description is entered and its importance level is entered on the group level (column 215). For example, in the case as shown in FIGS. 4A and 4B, if a larger value entered to the group level is assumed to indicate a higher importance level, the message having the content code of "cc5" and the group description of "B" sent by the processing portion 50 is sent to both of the destination addresses of "4235D" and "3221F" because the importance level "B" is higher than "P". If "P" is specified as a group importance level, the message is sent only to the destination address "4235D". Further, as shown in FIG. 4B, the buffer description column 217 on the third line of that table for sending messages 210 is unknown. This indicates that a connection is not established and a buffer description is not allocated as shown in the corresponding communication establishment flag column 216.

Later, the description will be directed to the process of sending or receiving a message, implemented by the foregoing processing unit. At first, the process of receiving a message will be described.

Figure 5:
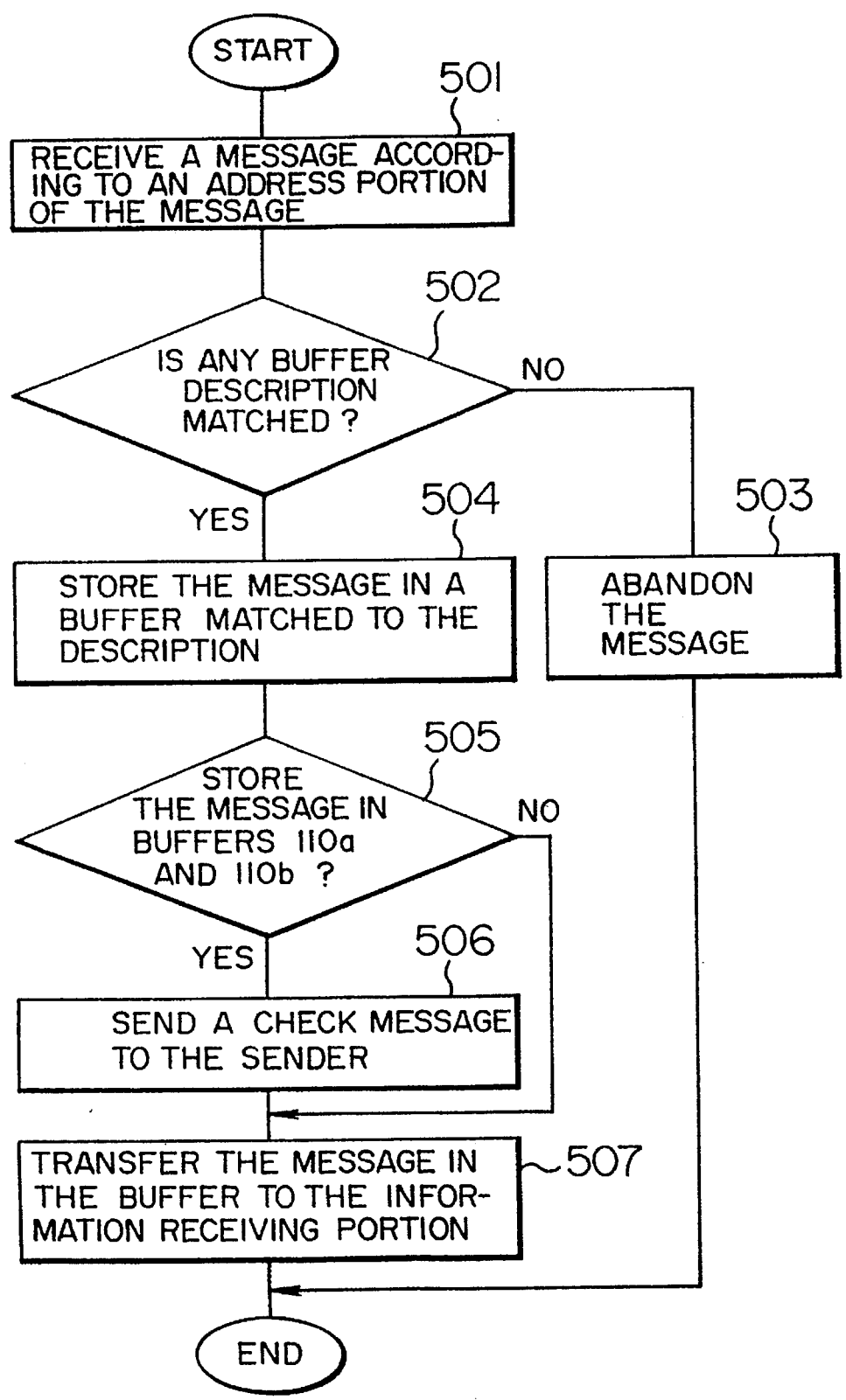
FIG. 5 is a flowchart showing processing of a communication processing portion when a message is received.

FIG. 5 is a flowchart showing a process of receiving a message from the communication medium 1, which is executed in the communication establishment portion 10. In the portion 10, at first, a communication control portion 120 serves to check a destination address entered in the destination address portion 302 of a message flowing on the communication medium 1. The communication control portion 120 receives the message only if the destination address is an address allocated to itself, a group of the processing units to which it belongs, or an address set for the Broadcast (step 501). When the message is received, the communication control portion 120 serves to refer to the buffer description portion 305 for checking if a buffer description matched the buffer description entered in the buffer description portion 305 is allocated to any of the buffers 110b to 112 (step 502). If no buffer has such a buffer description allocated thereto, the message is abandoned because it becomes unnecessary to the processing unit (step 503). If there is a buffer having a matched buffer description, the message received is stored in the buffer (Step 504). In this case, the communication control portion 120 stores in the buffer the message of the format shown in FIG. 3 from which the buffer description portion 305 is removed. If the buffer for storing the received message is the buffer 110b corresponding to the message sending portion without connection (step 505), the communication control portion 120 operates to send out a checking message to the destination processing unit, for checking if the message is received (step 506). The message given to the buffers 110b to 112 by the communication control portion 120 is transferred to the information receiving portion 20 through the effect of the message receiving portion based on connection 101, the message receiving portion without connection 102 and the message receiving portion based on Broadcast 103 (step 507).

According to this embodiment, for performing communication based on a connection, before sending or receiving an actual message, it is necessary to establish the connection between the sending processing unit and the destination processing unit. How to establish the connection will be discussed later.

Figure 6:
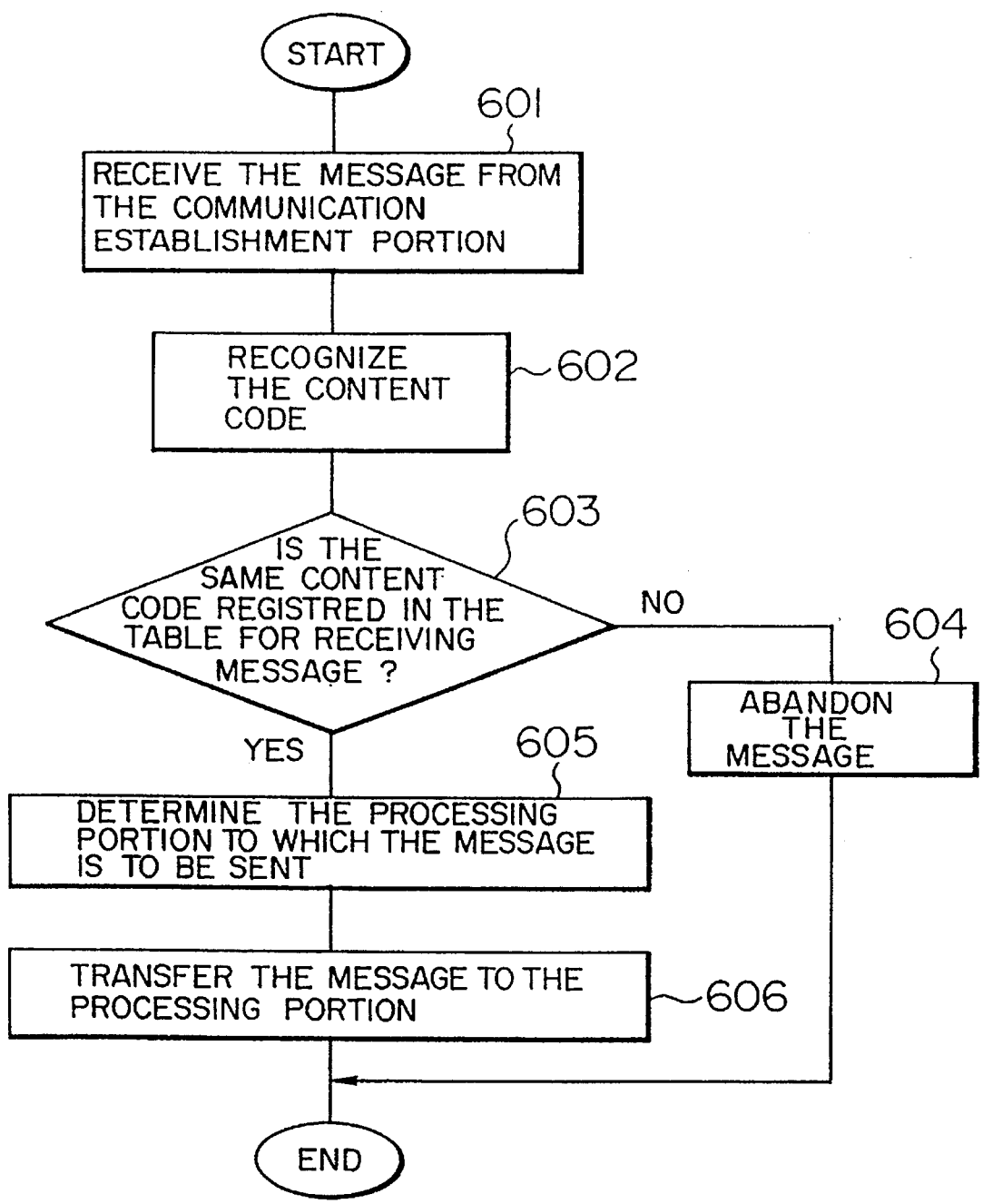
FIG. 6 is a flowchart showing processing of an information receiving portion when a message is received.

FIG. 6 is a flowchart showing a process of receiving a message in the information receiving portion 20. When a message is received from the communication establishment portion 10 (step 601), the information receiving portion 20 operates to refer to the content code portion 301 of the message for recognizing the content code added to the message (step 602). Next, by referring to the table for receiving messages 200 in the data transmission management area 200, it is determined whether or not the received message is transmitted to any of the processing portions 50. In this determination, the content code columns 201 of the table for receiving messages 200 are searched for checking whether or not there is any column having the content code matched to the recognized content code (step 603). If no matched code is found, the received message is abandoned and then the process is terminated (step 604). If any column is found to have the matched content code entered thereto, the processing portion registered in the processing portion column 202 corresponding to the content code column 201 is determined as the processing portion for transmitting the received message (step 605). Next, the message is transferred to the processing portion 50 determined at the step 605 and then the process is terminated (step 606).

Then, the process of sending a message will be described.

Figure 7:
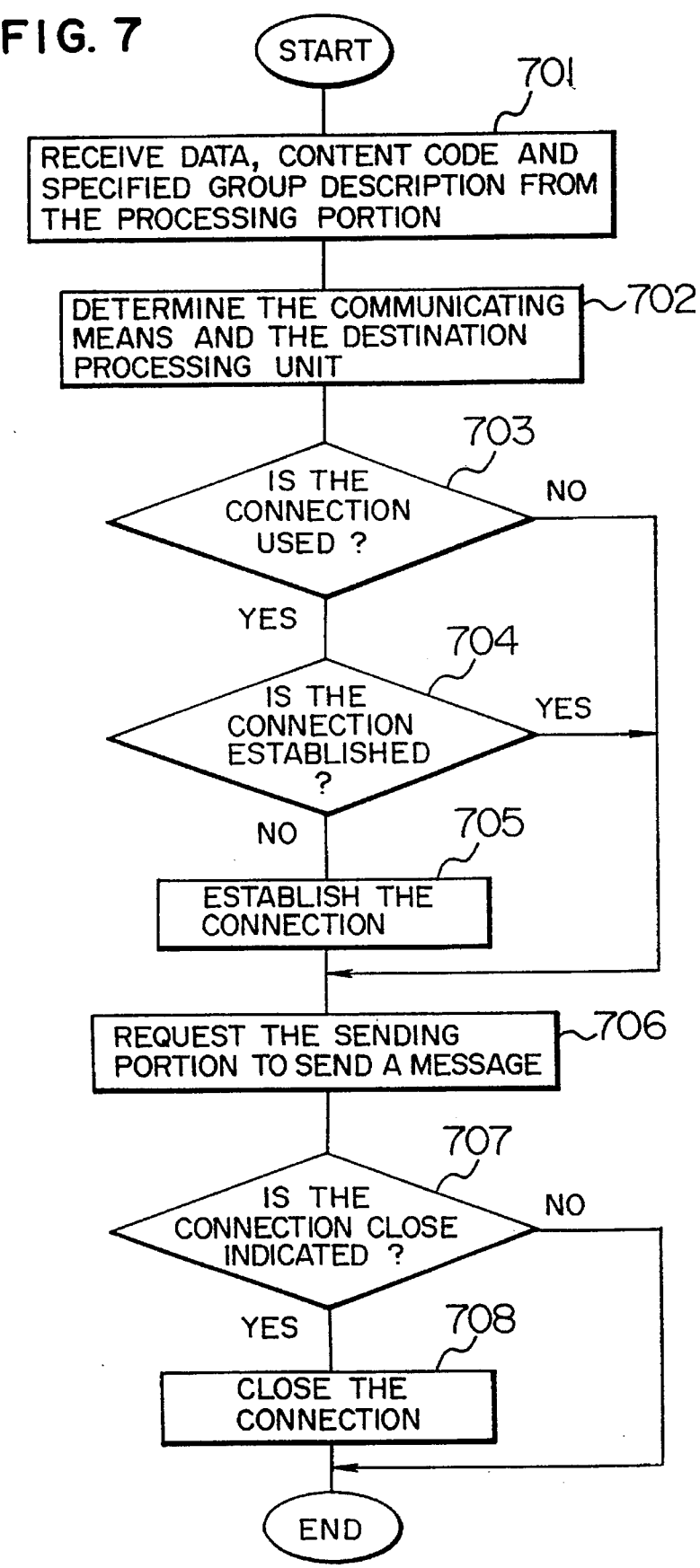
FIG. 7 is a flowchart showing processing of an information receiving portion when a message is sent.

The processing portion 50 operates to output the data of the processed result to be given to another processing unit. If another processing unit gives an inquiry to the processing portion 50, the processing portion 50 operates to output the data together with the content code predetermined according to the content of the data and the group description specified according to the importance level of the information. In this embodiment, the information sent by the processing portion 50 is passed to the information sending portion 30. FIG. 7 is a flowchart showing a flow of a process of sending a message, which is executed by the information sending portion 30.

The information sending portion 30, at first, receives the content code and the data accompanied with the specified group description from the processing portion 50 (step 701). The processing portion specifies to close the connection formed, if necessary. Next, by referring to the table for sending messages 210 in the data transmission management area 60 based on the specified content code and group description, the used communicating means and the destination processing unit are determined (step 702). Specifically, based on the content code and the group description specified by the processing portion, the table for sending messages is retrieved for obtaining a destination address registered in the destination address column 212 of a row containing the content code column 211 and the group description column 214 having the content code and group description specified therein. At this time, if a row has the same content code as the one specified in the content code column 211 specified in the content code column 211 and a different group description from the one registered in the group description column 214, by referring to the information entered into the group level column 215, it is checked whether or not the group of the processing units having the group description is included in the group having the specified group description. If the group description column 214 is found to have the group description included by the specified group description, it is determined whether or not the destination address registered in the corresponding destination address column 212 is a message destination. Next, by referring to the connection establishment column 213 corresponding to the content code column 211 and the group description column 214 for the specified content code and group description, it is checked whether or not the communication is done on the connection (step 703). If no indication to the connection is given in the connection establishment column 213, the operation goes to step 706. If the connection is used, by referring to the connection established flag column 216, it is determined whether or not the connection for communication is formed based on the content code and the group description specified by the processing portion 50 (step 704). If no flag is set to the connection established flag column 216 and no connection is made, the connection has to be established by the process to be discussed below (step 705). At step 706, the data received from the processing portion 50 is sent to the message sending portion 104 in order to request transmission of a message. The information sending portion 30 sends to the message sending portion 104 the content code indicated by the processing portion 50, a destination address determined at step 702, a connection judgement flag (set if a connection is used) according to the determined result of the step 703, information indicating a communication mode, and a buffer description registered in the buffer description column 217 of the table for sending messages 210. When a request for sending a message to the message sending portion 104 is terminated, it is determined whether or not the close of the connection is determined to be indicated by the processing portion 50 (step 707). If no indication to close the connection is given, the process is terminated. If any indication is given, the connection used for the communication is closed and then the process is terminated (step 708).

When the message sending portion 104 receives a message and a buffer description sent out from the information sending portion 30, the message sending portion 104 operates to create a message of a format sent out onto the communication medium 1 shown in FIG. 3 from the received information and store the message in the buffer 113. The message stored in the buffer 113 is read by the communication control portion 120 and then is sent on to the communication medium 1. The communication control portion 120 waits for a response to the message if the send message is transmitted on the connection. If no response message is given back, the process of resending the message is terminated. By referring to the connection judgement flag 303 added to the message, it is possible to know whether or not the message received from the message sending portion 104 is transmitted on the connection.

Next, the description will be directed to a process of establishing the connection when using the connection for communicating the message. The flow of the process of establishing the connection is shown in FIG. 8. FIG. 8A is a flowchart showing a process executed by the processing unit for transmitting the message when the connection is established. FIG. 8B is a flowchart showing a process executed by the processing unit for receiving the message when the connection is established.

At first, if a connection is required to be established when transmitting a message (step 705 of FIG. 7), the information sending portion 30 operates to determine the buffer description allocated to the buffer 110b of the receiving processing unit and then stores the buffer description in the buffer description column 217 of the table for sending messages 210 (step 801). Then, the portion 30 specifies the buffer description determined as a destination address and requests the sending portion 104 to send out a request for establishing a connection (step 802). In response to a request from the information sending portion 30, the message sending portion 104 has the information indicating the Unicast or the Multicast and the description allocated to the buffer 110a in the destination address portion 302, the communication mode portion 304 and the buffer description portion 305. The message is configured to enter the buffer description determined at the step 801 into the data portion 306. The message requiring a connection establishment which is stored in the buffer 113, is sent onto the communication medium 1 by the communication control portion 120 (step 803). Then, the communication control portion for sending a message operates to wait for a response from the receiving processing unit (step 804). The communication control portion 120 provided in the processing unit for sending a message operates to notify the information sending portion 30 of the response from the receiving processing unit (step 805). In response to the notice, the information sending portion 30 operates to set a flag to the connection established flag column 216 for the table for sending messages 210 (step 806).

On the other hand, the message requiring the connection establishment, the message being sent at the step 803, is received by the communication control portion provided in the processing unit for receiving the message (step 811) and then is sent to the message receiving portion based on connection 101 through the buffer 110a (step 812). When the portion 101 receives the message for requiring the connection establishment, the message receiving portion based on connection 101 operates to recognize the buffer description for performing communication based on the connection established on the sent message and arrange the buffer 110b to which the buffer description is allocated (step 813). When the buffer 110b is arranged and the connection is established, the message receiving portion based on connection 101 requests the communication control portion 120 to send the response for indicating the termination of establishing the connection to the processing unit for sending the message (step 814).

After a connection is established between the processing unit for sending a message and the processing unit for receiving a message according to the aforementioned process, the established connection is used for communicating the message. If the sending processing unit sends a message on the Unicast, a connection with one specific processing unit is established by means of the foregoing method. Further, if the message is communicated on the Multicast, the connection between the sending processing unit and each of the destination processing units may be established by the foregoing method.

Further, to close the established connection, the information sending portion 30 provided in the processing unit for sending a message operates to reset the flag set to the connection established flag column 217 for the table for sending messages 210 and transmit a message requesting that the connection be closed to the processing unit for receiving the message. In response to the message requesting that the connection be closed, the message receiving portion based on connection 101 provided in the receiving processing unit operates to open the buffer arranged for the connection, for closing the connection.

For the communication between the processing units based on the connection established by the above-mentioned process, the connection is allowed to be used by the two ways to be described below. In this embodiment, either way may be used. In actuality, it is preferable to select a more suitable way by considering the characteristics of the system configuration.

At first, as a first method, a sole connection is established between the processing unit for sending a message and the processing unit for receiving a message. All the communication between both of the processing units is done through just one connection. This way does not need to establish a connection therebetween each time a communication is started and thereby makes it possible to reduce the time taken in sending or receiving the message. As compared with the second way to be discussed below, the number of connections established between both of the processing units is made smaller, thereby reducing the load of the system network. If, however, the message is transmitted on the Multicast but is not required by one or some of the destination processing units, those processing units have to receive the message. Though no processing portion 50 is provided to use the message, the information receiving portions of those processing units operate to retrieve the destination processing portion of the message received on the content code. It means that the receiving overhead burdened in the information receiving portion is made larger, thereby disadvantageously lowering the efficiency.

As the second way, on the other hand, connection 706 between the processing units is established according to the content code added to the message, that is, each content of the message. To realize establishment of such a connection, the buffer description corresponding to the content code added to the message to be transmitted is used for establishing the connection. The processing unit for receiving the message operates to establish the connection based merely on the buffer description for the content code of the message required by the processing unit itself. This second way, therefore, needs to establish the connection each time a message having new content is transmitted, thereby increasing the processing time therefore. Each processing unit, however, operates to establish the connection based merely on the buffer description set to the content code of the message required by itself. Once the connection is established, any message read into the processing unit is allowed to be determined to be necessary. Unlike the first way, the information receiving portion provided in the receiving processing unit does not need to do any unnecessary processing so that each processing unit may efficiently receive only the message required by the processing portion.

In this embodiment, the system has a capability of increasing a new processing unit while it is operating on line. As an example, the below description will be directed to how a new processing unit 6 is connected to the system configured of the processing units 2 to 5, as shown in FIG. 1, operates.

Figure 9:
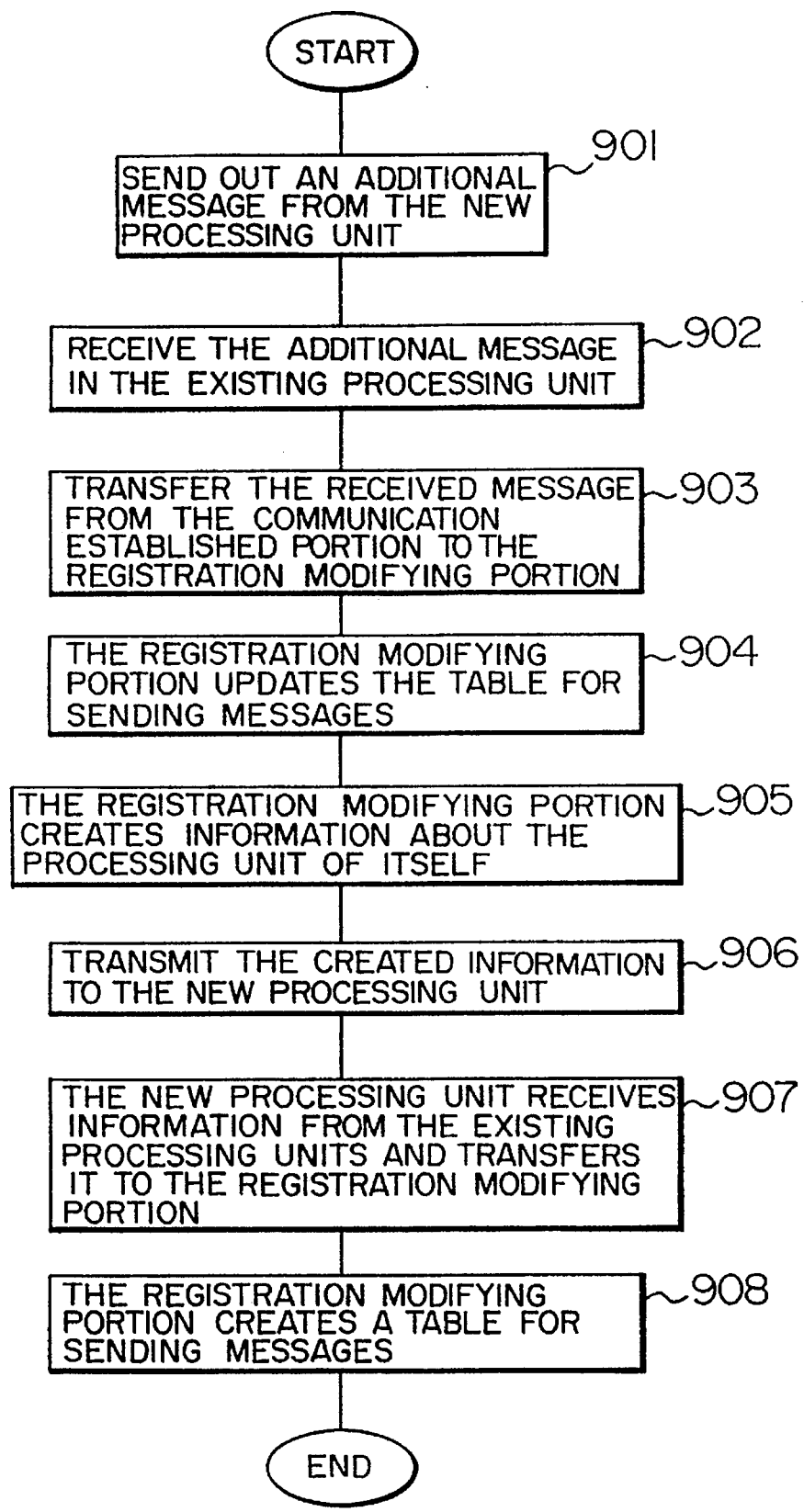
FIG. 9 is a flowchart showing a process implemented when a new processing unit is connected to the system.

FIG. 9 is a flowchart showing the flow of processing when a new processing unit is added to the system. When the new processing unit 6 is added to the system, the processing unit 6 serves to broadcast an additional message having the information about itself onto the communication medium 1 (step 901). This additional message may use a similar format to that shown in FIG. 3. The predetermined content code is entered into the content code column 301 in order to indicate that the information concerns a newly additional processing unit. The data portion 306 has to contain the information to be required to update the table for sending messages 210 of the existing processing unit so as to add an address allocated to the processing unit 6 and the content code for the content of the data used for the processing portion 50 of the processing unit 6 to the table 210.

The additional message is broadcast onto the communication medium 1 so that the message may be received by the communication control portions 120 of all of the existing processing units 2 to 5 (step 902). Inside of each processing unit, the additional message received by the processing units 2 to 5 is passed from the communication control portion 120 to the information receiving portion 20 through the buffer 112 and the message receiving portion on Broadcast 103. Further, the information receiving portion 20 operates to recognize the received message is an additional message by referring to the content code portion of the additional message and then to send the data portion 306 of the additional message to the registration modifying portion 40 (in which the correspondence between the content code added to the additional message and the registration modifying portion 40 is registered in the table for receiving messages 200) (step 903). The registration modifying portion 40 updates the table for sending messages 210 based on the received information about the new processing unit 6 (step 904). When the table 210 is updated, the information about its own processing unit is created in the portion 40. The information created by the registration modifying portion 40 contains each address of the processing units 2 to 5 and the content code for the data required for the processing portion 50 of each of the processing units 2 to 5. The information created at step 905 is sent from the registration modifying portion 40 to the information sending portion 30 together with the address of the added processing unit 6 and then is transmitted to the processing unit 6 in the Unicast mode (step 906). When the processing unit 6 receives the message containing the information about each of the processing units, as in the operation at step 903, the message is transferred to the registration modifying portion 60 (step 907). The registration modifying portion 40 of the processing unit 6 operates to create its own table for sending messages 210, based on the information sent from each of the existing processing units (step 908).

Along the foregoing process, the table 210 of each of the existing processing units 2 to 5 is updated and the table 210 of the new processing unit 6 is created. Then, the method described above makes it possible to transmit a message among the processing units containing the new processing unit 6.

In turn, when the new data is required to be received by a certain processing unit included in the system, or if unnecessary data exists, the content of the table 210 provided in another processing unit is updated like the process performed when the new processing unit is added. Specifically, the subject processing unit in which the change takes place serves to transmit a message having the new information in the data portion to another processing unit in the broadcast mode. The information contains a content code and a group description and concerns data which becomes necessary or unnecessary. The receiver processing unit operates to update the content of the table for sending messages 210 based on the received message through the effect of the registration modifying portion 40. In this case, unlike the addition of a new processing unit, no special information is notified from the receiver processing unit to the sender processing unit. No process located after step 905 (FIG. 9) in the process of adding the new processing unit is carried out in this case.

The above description concerns one embodiment of the present invention. In this embodiment, to determine the destination (an address of a destination processing unit) output from the processing portion, a mode (Unicast, Multicast, and Broadcast) for sending, or a sending method (whether or not a connection is to be established), the information sending portion operates to refer to the content code as well as the group description corresponding to the importance level of the message to be sent. However, this determination is allowed to be made based merely on the content code, or the destination processing unit may be determined on the content code. Further, the sending mode or the sending method may be determined on the group description indicated by the processing portion. In addition to the importance level of the information to be sent, the group description may contain some description for a priority of the information to be sent, such as an occurrence frequency of information, a quantity of information, an emergency level, or whether or not the information is test data. Such a description makes it possible to determine the sending mode or the sending method. For example, regarding the information of an occurrence frequency, a counter is used for counting the time of occurrence of a message at predetermined time intervals in order to correspond to the content code added to the message to be transmitted. If the counted value is larger than a predetermined value, a connection is established. If it is equal to or lower than the predetermined value, a communication is started with no connection being established. By determining whether or not a connection is to be established according to the above process, if the occurrence frequency is low, the communication is started without enhancing the load burdened on the network. If the occurrence frequency is high, it is possible to prevent the loss of the message resulting from the overflow of the buffer of the receiving processing unit.

According to this embodiment, the destination of the information output from the processing portion, the mode at which information is transmitted, and the method for transmitting the information are determined by each of the processing units, based on the content code and the importance level indicated by the processing portion. Hence, the processing portion provided in each processing unit just indicates the content code predetermined according to the content of the information to be sent and the importance level of the information when the processing portion sends the processed result or a request for information to the processing portion of another processing unit. That is, the sender processing unit does not consider an address of a processing unit having the processing portion to which information is to be transmitted, a mode at which information is transmitted, and a method for transmitting information. Further, in this embodiment, a creator of a user program corresponding to the processing portion does not need to consider the system configuration. Hence, the creator can more efficiently create a program. The expansion of the system does not have any effect on the user program operating on the processing unit, because the processing unit itself copes with the expansion of the system. To open/close a connection in this embodiment, for example, a protocol referred to as TCP/IP may be used. The protocol is described in "TCP/IP—Network Protocol and Implement—" written by NISHIDA Takeshi and published by Soft Research Center. To use the TCP/IP, the socket file on the TCP/IP corresponds to the buffer and the port number corresponds to the buffer description in this embodiment. By establishing a connection according to the procedure defined by TCP/IP, the function of this embodiment is realized.

Next, the description will be directed to the second embodiment. In the aforementioned embodiment, the message to be transmitted is divided into groups depending on their importance levels so that each message group may have a group description. The destination (destination range) of the message, the mode in which the message is transmitted, and whether or not the connection is established are determined based on the content code and the group description. On the other hand, the system according to the present embodiment is arranged to define a set of destination processing units as a group. Further, when the information is output from the processing portion, only the content code is specified. The destination to which the message having the information is transmitted and whether or not the connection is established are determined according to the content of the information output from the processing portion.

The system according to the present embodiment and each processing unit included in the system have the same arrangement as the system according to the first embodiment as shown in FIGS. 1 and 2. However, the present embodiment operates to define a combination of the processing units as a group. Hence, the way of managing information in the data transmission management area 60 provided in each processing unit is different from that provided in the aforementioned embodiment. According to the present embodiment, a table for sending messages 1000, as shown in FIG. 10A, includes a content code column 1001 to which the content code specified by the processing portion is given, a connection establishment column 1002 for indicating whether or not a connection is established, a group description column 1003 for identifying a group of the destination processing units, a connection established flag column 1004 to which a flag is set for indicating whether or not a connection is established, and a buffer description column 1005 to which a buffer description allocated to the buffer is given by the processing unit for receiving a message. The buffer description column 1005 is used when a message is transmitted on the established connection. Further, according to the present invention, to manage information about each group, a data attribute table 1010 is provided in the data transmission management area 60. The data attribute table 1010, as shown in FIG. 10B, consists of a destination address column 1012 for holding addresses of processing units of each group and a group level column 1013 for holding an importance level given to each group. The given data corresponds to the group description given to the group description column 1011.

According to the present embodiment, when a message is transmitted, the information processing portion 30 determines a group of the processing units for transmitting the message having information output by the processing portion and whether or not a connection is to be established, based on the content code specified by the processing portion 50. Further, by using the group description recognized as the determined result, the addresses of destination processing units and the importance level of the group are determined based on the data attribute table. The importance level of a group is treated like that in the aforementioned embodiment. The process at each portion when transmitting or receiving a message is performed as in the aforementioned embodiment. Hence, the process is not described herein.

In the second embodiment, the system of the invention may be arranged to determine whether or not a connection is to be established at each group of destination processing units. Such a system configuration will be described below. This holds true to the third embodiment, in which the arrangement of each processing unit is substantially the same as that of the first embodiment. The description will be directed to the different aspects of the first and the third embodiments.

This embodiment uses a table for sending messages table 1100 and a data attribute table 1110 as shown in FIGS. 11A and 11B. The sending messages table 1100 contains, in correspondence to a content code column 1101 which sets the content code for output information, a group description column 1102 to which a group description of a destination group is entered. On the other hand, the data attribute table 1110, like that shown in FIG. 10B, contains, in correspondence to a group description column 1111 which sets a group description, a destination address column 1112, and a group level column 1113. Further, in addition, a connection establishment column 1114 and a buffer description column 1115 are provided in the data attribute table 1110. In this embodiment, whether or not a connection is used for transmitting a message is determined depending on each group of destination processing units. The connection is established when each group is defined. This contributes to eliminating the burden of opening or closing the connection when the message is transmitted. As is obvious from FIGS. 11A and 11B, it is not necessary to provide the connection established flag indicating the state of the connection. If the establishment of a connection in advance disadvantageously brings about increase of load on the network, the present embodiment, like the foregoing two embodiments, may provide a connection established flag so that a connection may be established if necessary.

The present invention has been described with reference to the embodiments. However, it goes without saying that the present invention is not limited to the foregoing embodiments. For example, in those embodiments, the mode for sending a message and whether or not a connection is to be established are determined based on the content of the information to be sent and/or the importance level thereof, and for determination thereof, the number of destination processing units for sending a message may be used. Further, when a message is sent on the Multicast, the Multicast address is entered into the destination address column of the table for sending messages. In place, proper addresses uniquely given to the destination processing units are listed in the destination address column. Further, another column may be provided for entering the information indicating a mode used for sending a message.

As described above, according to the present invention, transmission of a message between the processing units connected through a network is allowed to be realized on the content of the message or the sending mode and the sending method which are suitably selected according to the qualitative characteristic of the information such as importance level. The transmitting range of a message may be dynamically changed according to the qualitative characteristic or the content of the information. If a system configuration may be changed like a system expansion, each processing unit may cope with the change on line.

What is claimed is:

1. A method for transmitting a message in an information processing system having plural processing units connected through a communication medium, said method comprising the steps of:

predetermining a data description corresponding to contents of information to be transmitted on the communication medium;

receiving the information to be transmitted on said communication medium from a processing portion of a first processing unit included in said plural processing units and the predetermined data description corresponding to contents of said information;

determining a destination processing unit for receiving said information transmitted from said first processing unit, based on said data description; and transmitting said information to said communication medium for said determined destination processing unit.

2. A method for transmitting a message as claimed in claim 1, wherein said determining step is executed according to the predetermined data description and said destination processing unit.

3. A method for transmitting a message as claimed in claim 1, wherein said transmitting step is executed wherein an address for identifying said destination processing unit and said data description are added to said information before said information is transmitted to said communication medium.

4. A method transmitting a message as claimed in claim 3, further comprising the steps of:

determining whether or not said information is directed to a second processing unit included in said plural processing units by referring to said address added to said information transmitted to said communication medium; and receiving said information if said information is directed to said second processing unit determined as a result of said second processing unit determining step.

5. A method for transmitting a message as claimed in claim 4, further comprising the steps of:

determining a processing portion operated in said second processing unit, using said data description added to said information; and transferring said information to said determined processing portion.

6. A method for transmitting a message as claimed in claim 5, wherein the step of determining said processing portion is executed by referring to a predetermined table for defining a correspondence between said processing portion and a data description for said information used by said processing portion.

7. A method for transmitting a message as claimed in claim 1, wherein the step of determining said processing unit comprises the substeps of:

selecting a sending mode for transmitting said information based on said data description; and selecting a sending method used for transmitting said information from at least two selecting methods having respective reliabilities, based on said data description, wherein said information is transmitted in the sending mode according to the sending method selected by said selecting substeps.

8. A method for transmitting a message as claimed in claim 7, wherein in the step of selecting the sending mode, said selecting mode is selected from among a Unicast mode in which another processing unit is specified in said system, a Broadcast mode in which plural processing units comprising part of said system are specified, and another Broadcast mode in which all of the processing units are specified.

9. A method for transmitting a message as claimed in claim 7, wherein in the step of selecting a sending method, the sending method is selected from among a first communication method for performing communication according to a predetermined procedure and through a connection established between the sending processing unit and the destination processing unit and a second communication method for performing communication with said destination processing unit without said connection.

10. A method for transmitting a message in an information processing system having plural processing units connected through a communication medium, said method comprising the steps of:

predetermining a data description corresponding to contents of information to be transmitted on the communication medium and an attribute representing a qualitative characteristic of said information;

receiving, in a first processing unit included in said plural processing units, said information to be transmitted from a processing portion operated in said first processing unit to said communication medium, said data description included with said information and predetermined according to contents of said information, and said attribute representing the qualitative characteristic of said information;

determining a destination processing unit based on at least one of said data description and said attribute; and transmitting said information, via said communication medium, to said determined processing unit.

11. A method for transmitting a message as claimed in claim 10, wherein said determining step includes a substep of selecting any one of a first communication method for establishing such a connection for performing communication according to a predetermined procedure for enhancing the reliability of said information and a second communication method for transmitting said information with no connection being established, based on at least one of said data description and said attribute, and wherein said information is transmitted to said communication medium according to the communication method selected at said selecting step.

12. A method for transmitting a message as claimed in claim 11, wherein said attribute includes a group description indicating which of plural groups of said plural processors said information is to be transmitted, said plural groups being defined according to a level of importance of said information to be transmitted, and in said selecting step, said first communication method is selected if said group description indicates that the importance level of said sending information is higher than the predetermined level or said second communication method is selected if the importance level is lower than the predetermined level.

13. A method for transmitting a message as claimed in claim 11, further comprising the steps of:

counting an occurrence frequency of the information corresponding to each data description; and recording said count for each data description.

14. A method for transmitting a message as claimed in claim 13, wherein said selecting step includes the substeps of:

referring to the occurrence frequency of said information corresponding to said description specified by said processing portion;

comparing the occurrence frequency of said sending information corresponding to said description specified by said processing portion, obtained as a result of said referring step, to a predetermined occurrence frequency; and selecting said first communication method if said occurrence frequency exceeds said predetermined occurrence frequency or selecting said second communication method if said occurrence frequency is smaller than said predetermined occurrence.

15. A method transmitting a message as claimed in claim 11, wherein said attribute information includes information indicating whether or not said information is test data, and in said selecting step, if said information is determined to be test data according to said attribute information, said second communication method is selected, or if said sending information is determined not to be test data, said first communication method is selected.

16. A method for transmitting a message in an information processing system having plural processing units connected through a communication medium, said method comprising the steps of:

predetermining an attribute representing a qualitative characteristic of information to be transmitted on the communication medium;

receiving, in a first processing unit included in said plural processing units, information to be transmitted from a processing portion operating in said first processing unit to said communication medium and said attribute information representing the qualitative characteristic of said information;

selecting a sending mode for transmitting said information based on said attribute information; and transmitting said sending information to said communication medium according to said selected sending mode.

17. A method for transmitting a message in an information processing system having plural processing units connected through a communication medium, said method comprising the steps of:

predetermining an attribute representing a qualitative characteristic of information to be transmitted on the communication medium;

receiving, in a first processing unit included in said plural processing units, information to be transmitted from a processing portion operating in said first processing unit to said communication medium and said attribute information representing the qualitative characteristic of said information;

selecting a transmitting method for transmitting said information from at least two transmitting methods having respective degrees of reliability; and transmitting said information to said communication medium according to the selected transmitting method.

18. A method for sending a message as claimed in claim 17, wherein said attribute information includes information representing an importance level of said information, and in said selecting step, a less reliable transmitting method is selected if said information is determined to be test data by said attribute information or a more reliable transmitting method is selected if said information is determined not to be test data.

19. A method for sending a message as claimed in claim 17, wherein said attribute information includes information representing whether or not said information is test data, and in said selecting step, when said attribute information represents that said information is test data, a less reliable transmitting method is selected, and when said attribute information represents that said information is determined not to be test data, a more reliable transmission method is selected.

20. An information processing system, comprising:

a communication medium for transmitting a message;

means for predetermining a data description corresponding to contents of information to be transmitted on the communication medium and an attribute representing a qualitative characteristic of said information; and plural processing units connected through said communication medium, each of said processing units including:

at least one processing portion for executing a predetermined process;

determining means for receiving information to be sent from said processing portion to another processing unit, said data description predetermined according to the content of said the information, and said attribute information representing the qualitative characteristic of said information, and for determining an address of a destination processing unit based on at least one of said data description and said attribute information;

means for transmitting said information together with said data description and said address to said communication medium according to the determined result of said determining means;

means for receiving said information based on the address added to the information transmitted to said communication medium; and means for determining a processing portion to which said information received according to said data description is to be transmitted and for transferring said information received to said processing portion based on said determined result.

21. An information processing system as claimed in claim 20, wherein each of said processing units includes a table for information to be referenced by said determining means, said table having an address of said destination processing unit corresponding to said data description and said attribute information.

22. An information processing system as claimed in claim 21, wherein said table for transmitting information includes a flag to be set when using a more reliable communication method, said communication method being executed through a connection established between the transmitting processing unit and the destination processing unit in a manner to correspond to said data description and said attribute information.

23. An information processing system as claimed in claim 22, wherein said determining means includes means for determining whether or not the communication method with a high transmitting reliability, executed through said connection, is used by referring to said flag to transmit said information.

24. An information processing system as claimed in claim 21, wherein said table for transmitting information includes information indicating a sending mode used for transmitting said information, said information being registered in a manner to correspond to information representing said data description and said characteristic.

25. An information processing system as claimed in claim 22, wherein said information indicating the sending mode indicates any one of a Unicast mode in which another processing unit in the system is specified, a Multicast mode in which plural processing units configuring part of said system are specified, and a Broadcast mode at which of the processing units in the system are specified.

26. An information processing system as claimed in claim 25, wherein said determining means includes means for determining the sending mode used for transmitting said information by referring to the information indicating said sending mode.

27. An information processing system as claimed in claim 20, wherein each of said processing units includes a table for received information in which a correspondence between said processing portion and the data description corresponding to information used by said processing portion is registered, said table being referenced by said transfer means.

28. A method for transmitting a message in an information processing system having plural processing units connected through a communication medium, said method comprising the steps of:

pre-setting in each of said processing units a table for transmitting information, said table including a content code predetermined according to the information output from a processing portion operating in each processing unit, an address of a destination processing unit to which said information is to be transmitted, a sending mode used for transmitting said information, and a flag indicating whether or not a more reliable communication method having a connection established between the processing units is used for transmitting said information;

receiving, in a first processing unit of said plural processing units, information to be sent from said processing portion onto said communication medium and said content code for the content of said information;

determining the destination processing unit, the sending mode used for transmitting said information, and whether or not said connection is to be established for transmitting said information by retrieving said table based on said content code;

transmitting said information to be transmitted together with said content code and said address of the determined destination processing unit to said communication medium according to the determined result; and receiving in the second destination processing, information to be transmitted on said communication medium by referring to said address.

29. A method for transmitting a message as claimed in claim 28, further comprising the steps of:

transmitting information about a third processing unit being newly connected to said communication medium from said third processing unit to said plural processing units; and receiving, in said plural processing units, information about said third processing unit and updating said table for sending information to be transmitted, based on the received information.

30. A method for transmitting a message as claimed in claim 29, further comprising the steps of:

sending information about each of said plural processing units from said plural processing units to said third processing unit; and receiving, in said third processing unit, information about each of said processing units sent from said plural processing units and creating said table for transmitting information to be transmitted in said third processing unit.

* * * * *